M. J. HUGGINS AND W. C. DRESSLER.
SPEED CONTROLLING MECHANISM FOR AUTOMOBILES.
APPLICATION FILED AUG. 5, 1916.
1,354,303.
Patented Sept. 28, 1920.
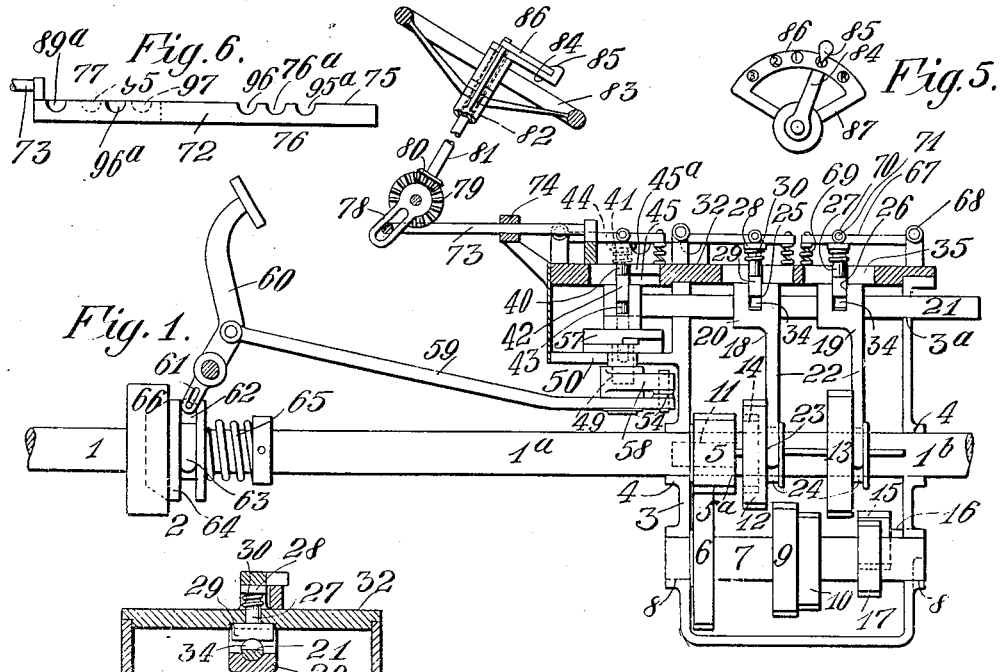
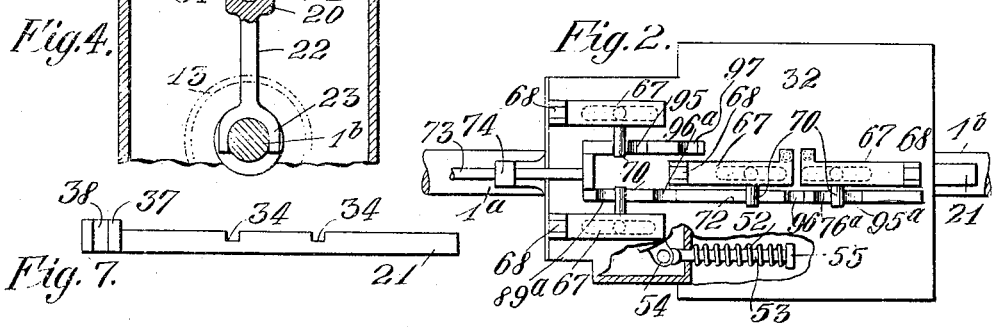
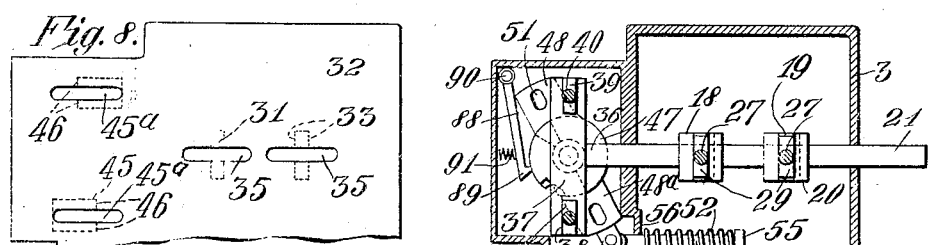
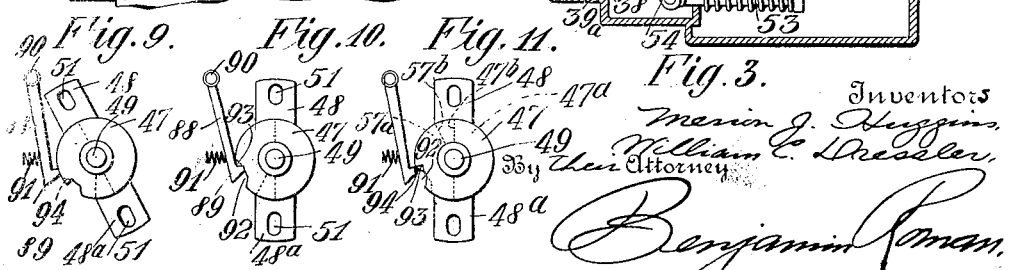

UNITED STATES PATENT OFFICE.

MERION J. HUGGINS AND WILLIAM C. DRESSLER, OF NEW YORK, N. Y.; SAID HUGGINS ASSIGNOR OF HIS RIGHT TO AUTOMOTIVE DEVELOPMENT CO., INC., OF NEW YORK, N. Y., A CORPORATION OF NEW YORK.

SPEED-CONTROLLING MECHANISM FOR AUTOMOBILES.

1,354,303.     Specification of Letters Patent.     Patented Sept. 28, 1920.

Application filed August 5, 1916. Serial No. 113,283.

*To all whom it may concern:*

Be it known that we, MERION J. HUGGINS and WILLIAM C. DRESSLER, both citizens of the United States, and residents of the city of New York, in the county of Kings and State of New York, have invented certain new and useful Improvements in Speed-Controlling Mechanism for Automobiles, of which the following is a specification.

This invention relates to automobiles, particularly to the speed controlling mechanism thereof, and its principal object is to provide simple, efficient, reliable, and improved means for controlling the speed of the automobile, and for driving the automobile wheels at a variable speed relatively to the speed of the engine or prime mover.

Another object is to provide improved, conveniently operated, and readily responsive means for controlling the changing of the speeds and reversing of the wheels.

Other objects and advantages will hereinafter appear.

In the accompanying drawings,—

Figure 1 is a general view, partly in section and partly in full, showing an elevation of an automobile gear transmission, to which the invention is here shown as adapted, with the operating mechanism therefor.

Fig. 2 is a general plan view of the mechanism shown in Fig. 1.

Fig. 3 is a sectional plan view of the mechanism shown in Fig. 1.

Fig. 4 is a sectional end elevation of the mechanism shown in Figs. 1, 2, and 3.

Figs. 5, 6, 7, and 8 are details of said mechanism.

Figs. 9, 10, and 11 are detail views illustrating the operation of parts of the mechanism.

A shaft 1, driven by the automobile engine, not shown, drives a section $1^a$ thereof, which is split therefrom at clutch 2, Fig. 1, and extends to the gear-casing 3, where it is mounted in bearings 4 of said casing. The shaft-section $1^a$ carries a wide gear 5 which drives a gear 6 that is keyed upon and drives a counter-shaft 7 mounted in bearings 8 of said casing. Said counter-shaft carries drive gears 9 and 10 of different sizes, and the rear shaft-section $1^b$ of the drive shaft, split from shaft-section $1^a$ at 11 and running independently thereof, carries coöperating transmission gears 12 and 13 splined to shift thereupon so that any one of said transmission gears may be caused to mesh with and unmesh from its coöperating drive gear on said counter-shaft, and various speeds may be thereby transmitted to the shaft $1^b$, which in turn drives the wheels of the automobile, not shown, at various speeds. Thus when the gears 12, 13 are unmeshed, the counter-shaft 7 driven by gears 5, 6 from shaft-section $1^a$ runs idly and no motion is transmitted to the shaft-section $1^b$, and when the gears 13, 10 are meshed a low speed is imparted to the shaft-section $1^b$. Likewise, when the gears 12, 9 are meshed a higher speed is transmitted to the shaft $1^b$, and when the gear 12 having an internal gear 14 is shifted to mesh the internal gear with the portion $5^a$ of wide gear 5 the shaft-section $1^b$ is driven at highest speed, directly from shaft-section $1^a$. In order to rotate the shaft $1^b$ oppositely for reversing the automobile wheels, the gear 13 is meshed with an intermediate idler-gear 15, which is mounted on a stud 16 fixed to casing 3 and is driven by a drive gear 17 carried upon the counter shaft 7. The gears are meshed and unmeshed by means of shifting devices 18, 19 which comprise hubs 20 carried upon a rod 21 mounted in guiding ways $3^a$ of casing 3, arms 22 extending from said hubs, and forked portions 23 at the extremities of said arms that embrace shouldered collars 24 of the shiftable gears.

Within a notch 25 in the hub 20 of each shifting device is carried a locking latch 26, which consists of a pin 27 having a flange 28 and a flattened portion 29 the lower part of which is located within the notch 25. And normally a spring 30 surrounding said pin presses against its flange 28 and lodges the upper part of its portion 29 within a receiving recess 31 formed in a plate 32 secured to the casing 3, whereby the shifting device is firmly maintained locked and shifting thereof is prevented, and the gear carried thereby is maintained locked in unmeshed state. The latches 26 bear against the sides 33 of their recesses 31, and in this manner prevent movement of the shifting devices 18, 19 and the gears 12, 13 carried thereby toward the right or toward the left while the gears are in unmeshed or neutral position. The rod 21 is shiftable longitudinally through the guiding ways $3^a$ and through the hubs 20 of the shifting devices 18, 19, either toward the right, from a neutral position, shown in the drawing, or toward the left from the neutral position, and said rod may be shifted backwardly from either of the said positions to which it has been moved, to its initial or neutral position. Said rod is provided with transverse notches 34 which register with the latches 26 when said rod is at its midway or neutral position, whereby upon pressing down any one of the latches 26, contrary to spring 30, toward the rod 21 while it is in neutral position, or just before it has returned to neutral position, the upper part of the flat latch-portion 29 is caused to leave its recess 31 in plate 32 and the lower part of this portion is compelled to enter its registering notch 34 in the rod, in which manner the particular shifting device carrying said latch is unlocked from the plate 32 and locked firmly to the rod 21. And hence, upon movement of the rod 21 from its neutral position said locked shifting device is carried along and shifted toward the right, as viewed in the drawing, if said rod has been shifted toward the right, but if the rod 21 has been shifted toward the left the shifting device thus locked thereto is carried along by the rod in an opposite direction and shifted from neutral position toward the left, whereby the gear carried by this shifting device 18 or 19, as the case may be, can be shifted in opposite directions from a neutral position and meshed with either of its coöperating drive gears. Conversely, during a subsequent return stroke of the rod 21 toward neutral position the shifting device previously locked thereto is shifted back and restored to neutral position, and the spring 30 of its latch then causes the latch-portion 29 to clear its notch 34 of the rod and to reënter its recess 31 in plate 32, in which manner the shifting device is restored to initial or locked neutral position and the gear carried thereby is unmeshed. Upon a subsequent stroke of the rod 21 away from its neutral position in any direction it either moves idly or together with the other shifting device or with the same shifting device, according to whichever of said devices has been locked thereto. During the movement of the shifting device its latch 26 is carried along therewith and the lower part of the flat portion 29 of the latch is maintained within its notch 34 in the rod 21 by the plate 32 bearing upon the upper face of said flat portion 29, the pin 27 of said latch being meanwhile retained within an elongated slot 35 in plate 32. Figs. 1 and 8.

To the end 36 of rod 21 is secured a cross-bar 37 provided at its extremities with notches 38 similar to the notches 25 of shifting devices 18, 19. Within each notch 38 is carried a locking latch 39, which consists of a pin 40 having a flange 41, a flattened middle-portion 42 the lower part of which is located within the notch 38, and a pin portion 43 extending from the portion 42 and being normally located within the notch 38. A spring 44 surrounding the pin 40 presses against flange 41 and lodges the upper part of flat portion 42 within a receiving recess 45 formed in the plate 32, whereby the rod 21 is firmly maintained locked and shifting thereof is prevented while it is situated in midway or neutral position, the edge 46 of both recesses 45 bearing against both latches 39, $39^a$ to normally maintain the rod 21 locked against longitudinal movement in either direction from neutral position. Upon pressing down the latch 39, contrary to its spring 44, toward the bar 37 while the rod 21 is in neutral position, or just before it has returned to neutral position, the upper part of the flat latch-portion 42 is caused to leave its recess 45 in plate 32, and the bar 37 and rod 21 are rendered free to move toward the left, while similarly pressing down the latch $39^a$ renders the rod 21 free to move toward the right. During the movement of the bar 37 both of the latches 39, $39^a$ are carried along therewith, and the latch which has previously been pressed is maintained in depressed state by the plate 32 bearing upon the upper face of the flat portion 42, the pin 40 of said latch being meanwhile retained within an elongated slot $45^a$ in plate 32, Figs. 1, 8, and the other latch being meanwhile permitted to travel along idly with the moving bar 37 by having its pin 40 retained within a similar slot $45^a$ and the upper part of its flat portion 42 traveling within its recess 45, which is made elongated as shown, to provide clearance for the portion 42 while it is traveling idly. A circular plate 47 provided with arms 48, $48^a$ is pivoted contrally upon a stud 49 which in turn is pivotally mounted in a fixed extension 50 forming part of the casing 3. Each of the arms 48, $48^a$ is provided at its end with an elongated opening 51, and the plate 47 and arms 48, $48^a$ may be swung or oscillated about their pivot, from the position shown in Fig. 3, to that shown in Fig. 10, to aline their openings 51 with the latches 39, $39^a$, whereby upon pressing down either of said latches its pin 43 is caused to enter the opening 51 opposite thereto and to thus unlock the rod 21 from plate 32 and to lock the rod to the arm 48 or $48^a$. Said arms are normally maintained in the position shown in Fig. 3 by means of a spring 52, which surrounds a bar 53 pivoted to a lug 54 forming part of arm $48^a$ and is located between a head 55 of said rod and a wall 56 of the casing 3. Upon swinging the arms 48, $48^a$ from the position shown in Fig. 3 to that shown in Fig. 10, the spring 52 becomes compressed, and upon releasing said arms they permit the spring 52 to restore the arms 48, 48ª to their initial or normal position and to thereby shift the rod 21 toward the right or toward the left, depending upon whether the latch 39 or 39ª has been previously depressed to lock the cross-bar 37 to the arm 48 or arm 48ª. Thus, assuming that the arms 48, 48ª are swung toward alinement with the cross-bar 37 and back to normal position, and the latch 39ª is depressed, the rod 21 is thereupon shifted from neutral position toward the right, while if the latch 39 is depressed the rod 21 is shifted from neutral position toward the left. Therefore, whichever of the devices 18 or 19 and the gear carried thereby has been previously locked to the rod 21 such device is shifted in one direction or in an opposite direction from its neutral position and its gear meshed accordingly, depending upon whether the latch 39 or latch 39ª of cross-bar 37 has been locked to its respective arm 48 or 48ª. The arms 48, 48ª are oscillated to actuate the rod 21 by means of a circular cam 57 which is centrally mounted upon and fixed to the stud 49 and is partially rotated with said stud. When said cam is rotated in a clockwise direction a segmental thickened portion 57ª thereof strikes a similar portion 47ª of arm-plate 47 and thereby swings the arms 48, 48ª about their pivot. The cam 57 is rotated by means of a lever 58, fixed to stud 49, and a link 59 which connects the lever 58 with a pedal 60 that is utilized for operating the drive-shaft clutch 2. Upon pressing of the foot-pedal 60 to swing it toward the left and releasing it to permit its return swinging toward the right, in the operation of the clutch, the cam is thereby rotated partially in opposite directions to oscillate the arms 48, 48ª to release said arms in the manner hereinafter seen, and, in conjunction with the action of spring 52, to move the rod 21 to perform its forward and backward stroke in either direction from its neutral position in the above described manner. Said pedal is connected to the clutch 2 by means of an arm 61 thereof which is slidably joined to the extension 62 of a fork 63 that embraces the cone-portion 64 of the clutch. Pressing of the pedal 60 moves the cone portion 64 toward the right contrary to the pressure of clutch-spring 65 and disengages it from its coöperating clutch member 66 to unclutch the shaft-portions 1, 1ª. Releasing of the pedal causes the spring 65 to engage the cone 64 with the member 66 to clutch the shaft-portions 1, 1ª, and to simultaneously swing the pedal back toward the right to its normal position shown in the drawing.

For each of the latches 26, 39, 39ª is provided an actuating lever 67 hinged to plate 32 at 68, and a spring 69 is secured to plate 32 and to the lever, whereby said lever tends to bear down upon its latch so as to compel it to enter its registering notch 25 or 38 at the moment the rod 21 reaches its neutral position. Each of the levers 67 carries a roller 70 mounted upon a stud 71 projecting therefrom. A block 72 is seated upon the plate 32 and is mounted to slide adjacent to the rollers 70 by means of a stem 73 thereof passing through a hub 74 projecting from the casing 3. The lever-rollers 70 bear against the top surface 75 of the block 72 and in this manner maintain the levers 67 in inoperative state, whereby they are normally prevented from pressing against the latches 26, 39, 39ª contrary to the power exerted by their springs 30, 44. And when the block 72 is slid, any one of a series of notches 76 thereof may be alined with a corresponding roller 70 of one of the levers 67 belonging to a corresponding latch 26, whereupon such roller drops into said notch and the lever 67 carrying said roller is thereby permitted to be pressed down by its spring 69 and to operate its latch 26 to compel it to enter its rod-notch 34 and lock its shifting device 18 or 19, to the rod 21. Simultaneously, as will be hereinafter seen, one of a series of notches 77 of block 72 becomes alined with a roller 70 of one of levers 67 belonging to latch 39 or 39ª, and thereupon such lever presses down upon its latch and operates it to lock the cross-bar 37 of rod 21 to the actuating arms 48 or 48ª. The stem 73 is joined to a slotted arm 78 secured to a bevel gear 79 which meshes with a gear 80 keyed upon a rod 81 that extends through and outwardly from the steering column 82 of the machine. Rod 81 is provided at its extremity above the steering wheel 83 with a lever 84 wherewith it may be rocked to rotate the gears 79, 80 to swing the arm 78 and impart a stroke to the block 72 toward the right or toward the left, as viewed in the drawing, to thereby aline one of its series of notches 76 and one of its series of notches 77 with two of the rollers 70 for operating corresponding latches 26, 39, 39ª. A pointer 85 extends from the extremity of lever 84 and around the outer side of a segmental frame 86 which is concentric with the rod 81 and is secured to the column 82 by means of brackets 87. Upon the frame 86 are marked speed indications, such as "Reverse" or "R," "Neutral" or "N," "1st," "2nd," and "Direct" or "3rd," and the lever 84 with its pointer 85 may be swung to point to any one of said indications.

In the operation of the gear transmission the lever 84 may be set to point to any one of the indications upon indicator frame 86, according to whichever coöperating pair of gears it is desired to mesh in the selection of speeds for the automobile wheels, and we will assume that said lever has been set to point to "R" or "Reverse" as shown. The block 72 is thereby set to bring its notch 76ª underneath the roller 70 of the actuating lever 67 that belongs to and coöperates with the locking latch 26 of shifting device 19, and the lever 67 is thereupon caused to press said latch against the rod 21. This setting of the block 72 simultaneously brings its notch 89 underneath the roller of the actuating lever 67 that belongs to the locking latch 39ª, whereupon said lever is caused to press this latch toward the cross-bar 37. Lever 84 having been thus set to the desired speed indication the remaining step in the operation of selecting a particular speed is to press and release the foot-pedal 60. Upon pressing of the foot-pedal the drive-shaft portions 1, 1ª are unclutched, and during the unclutching operation the cam 57 is first rotated idly, Fig. 9, to permit actual disengagement of clutch-members 64, 66, and then the cam-portion 57ª strikes the plate-portion 47ª, whereupon the arms 48, 48ª are oscillated in a clockwise direction contrary to the pressure of spring 52. This action of arms 48, 48ª alines their openings 51 with the pins 43 of locking latches 39, 39ª and incidently carries back therewith into neutral position the rod 21, which may have been previously locked to one or the other of said arms, and hence unmeshes or neutralizes any gear that may have been locked to the rod 21 and locks such gear firmly in neutralized state to the fixed plate 32. A pawl 88, having its engaging head 89 sufficiently wide to bear simultaneously against the edges of arm-plate 47 and cam 57, is hinged at 90 to casing 3 and is pressed upon by a spring 91 which compels it to normally bear against the edges of said plate and cam. At the termination of the said movement of the rod 21 toward neutral position and of the rotation and swinging of cam 57, arms 48, 48ª, and arm-plate 47, the engaging head 89 of pawl 88 drops into a notch 92 in plate 47 and into a notch 93 in cam 57, Fig. 10, and thereby engages said arm-plate and arms in swung position and locks the rod 21 in shifted position with the spring 52 in compressed state. At this moment the latch 39ª, having been just previously pressed against the cross-bar 37, causes its pin 43 to enter its registering opening 51 in arm 48ª and to lock the cross-bar 37 to said arm. Simultaneously, the latch 26 of shifting device 19, having been likewise just previously pressed against the rod 21, is thereby caused to enter its registering notch 34 in said rod and to lock the device 19 to the rod 21. Upon the immediate releasing of the pedal 60 the shaft-portions 1, 1ª are clutched, and during the first part of the clutching operation and of the releasing movement of the pedal the cam 57 rotates backwardly in a counter clockwise direction, and the edge 57ᵇ of its thickened portion 57ª moves away from and clears the edge 47ᵇ of the thickened plate-portion 47ª without affecting the arm-plate 47. During the interval of this initial part of the rotatable stroke of cam 57 a beveled cam-portion 94 at the side of its notch 93 engages the pawl-head 89 and forces the pawl 88 out of the plate-notch 92, Fig. 11, whereby said pawl and the arm-plate 47 become disengaged and the arms 48, 48ª, rod 21, and the compressed spring 52 are thus released. Said spring thereupon immediately actuates the rod 21 and imparting a snap movement thereto moves it to perform its stroke from neutral position toward the right, whereupon the rod 21 carries therewith the shifting device 19 locked thereto and shifts it with its gear 13 toward the right and meshes the gears 13, 15. The actual meshing of the gears, therefore, is performed solely by the action of spring 52, which upon being released is permitted to impart the snap movement to the arms 48, 48ª and in turn to the rod 21 without any coaction of their actuating cam 57 and independent of the releasing movement or control of the pedal 60 or the operation of the clutch 2. In the shifting of the gears the spring 52 is first caused to be compressed during the pressing of the pedal 60 and the unclutching operation, during the releasing of the pedal and the first part of the clutching operation the spring 52 is maintained locked in compressed state and the actuating cam 57 is rotated back idly to clear the edge 47ᵇ of the plate-portion 47ª, and during the termination of the clutching operation said spring is unlocked and permitted to impart the snap movement to the arms 48, 48ª and to the rod 21, which thus shifts the selected gear without control to mesh it with its coöperating gear. In addition to the mentioned functions of spring 52 it also serves to positively maintain the shifted gear in place and prevents accidental unmeshing thereof. It will be evident that the entire above described operation, of selecting and shifting the gears, is momentarily performed, requiring on the part of the operator merely the setting of the lever 84 and pressing of the pedal 60.

Should it be desired to unmesh the gears 13, 15, and to mesh any other coöperating pair of gears such as the gears 13, 10 for low speed, the lever 84 is set to point at "1," corresponding to such selection of speed, and it thereby sets the block 72 to aline its notch 95 to permit depression of latch 39, and to aline its notch 95ª with the roller 70 of actuating-lever 67 belonging to the latch 26 of shifting device 19. Then the pedal 60 is pressed and released, whereupon the arms 48, 48ª and rod 21 are actuated, and the rod 21 is shifted toward the left to neutral position and moves the shifting device 19 with the gear 13 back, thereby unmeshing the gears 13, 15 and locking the said device with the gear 13 to the plate 32 in unmeshed or neutral position. The shifting device 19 is at this moment again locked to the rod 21 by the previous depression of its latch 26, and the latch 39 is operated to lock said rod to the arm 48, and then the spring 52 actuates the arms 48, 48ᵃ with the rod 21 and causes the rod 21 to shift the device 19 with the gear 13 from neutral position toward the left and to mesh the gears 13, 10.

It will be seen by following the mechanism in the drawing, that in a similar manner setting of the lever 84 to point at "2nd" or intermediate speed and pressing of the pedal 60 will first unmesh and neutralize any coöperating pair of gears that may be meshed, and will set the block 72 to aline its notch 96 for depressing the latch 26 of shifting device 19 to lock said device to the rod 21, and will simultaneously, aline the block-notch 96ᵃ for depressing the latch 39ᵃ to lock the rod 21 to the arm 48ᵃ, whereupon said arms and rod are actuated by the spring 52 to mesh the gears 12, 9. Likewise, setting of the lever 84 to point at "3rd" or highest speed and pressing of said pedal will set the block 72 to aline its notch 97 for depressing the latch 39 for locking the rod 21 to arm 48, and to aline its notch 76ᵃ for depressing the latch 26 of shifting device 18 for locking said device to the rod 21. Upon releasing of the pedal the arms 48, 48ᵃ are actuated and the rod 21 is shifted to mesh the internal gear 14 inside of gear 12 with the gear 5 for direct driving.

Should it be desired to unmesh or neutralize any coöperating pair of gears that may be meshed, without necessarily selecting any other speed or meshing any other pair of gears, the lever 84 may be set to point at "Neutral" or "N" upon indicator frame 86. The block 72 is thereby set to dispose all of its notches between all of the rollers 70 of levers 67 and causes all of the levers 67 to be simultaneously maintained in inoperative state, so that upon subsequent pressing of the pedal 60 any gear that may be in mesh is unmeshed and restored to locked neutral position. It will be evident that with this mechanism any predetermined selection of speed desired may be made at any time before or after the swinging of the pedal 60 to perform the clutching operation of the drive-shaft, and such speed selection may be also made at any time and stage during the clutching operation.

Variations may be resorted to within the scope of the invention, and portions of the improvements may be used without others.

Having thus described my invention, I claim:—

1. In an automobile, the combination of speed changing gears, a movable member, mechanism to move said member to positions in opposite directions from a neutral position and to restore the member to neutral position, means to lock any one of said gears to said member, and means to lock said member to said mechanism.

2. In an automobile, the combination of speed changing gears, a movable member, mechanism to move said member to positions in opposite directions from a neutral position, means to lock any one of said gears to said member, means to lock said member to said mechanism for moving the member in one direction from neutral position, and means to lock said member to said mechanism for moving the member in an opposite direction from neutral position.

3. In an automobile, the combination of speed changing gears, a movable member, mechanism to move said member to positions in opposite directions from a neutral position, means to lock any one of said gears to said member, means to lock said member to said mechanism for moving the member in one direction from neutral position, means to lock said member to said mechanism for moving the member in an opposite direction from neutral position, and means to restore said member to neutral position from any one of said moved positions.

4. In an automobile, the combination of speed changing gears, a movable member, mechanism to move said member to positions in opposite directions from a neutral position, means to lock any one of said gears to said member, and means to lock said member to said mechanism.

5. In an automobile, the combination of speed changing gears, a movable member, mechanism to move said member to positions in opposite directions from a neutral position, a fixed member, means to maintain said gears and said movable member locked to said fixed member in neutral positions, means to unlock any one of said gears from said fixed member and to lock it to said movable member, and means to unlock said movable member from said fixed member and lock it to said mechanism.

6. In an automobile, the combination of speed changing gears, a movable member, means to maintain said member locked in neutral position, means to lock any one of said gears to said member, mechanism to move said member to positions in opposite directions from a neutral position, and means to unlock said member and to lock it to said mechanism.

7. In an automobile, the combination of speed changing gears, a movable member, pivoted arms, means to actuate said arms, means to lock any one of said gears to said member, means to lock said member to one of said arms for moving the member in one direction from a neutral position, and means to lock said member to the other of said arms for moving the member in an opposite direction from neutral position.

8. In an automobile, the combination of speed changing gears, shifting devices for said gears, a movable member, mechanism to move said member to positions in opposite directions from a neutral position, a locking means for each of said devices to lock it to said member, a locking means for said member to lock it to said mechanism for moving the member in one direction from a neutral position, and a locking means for said member to lock it to said mechanism for moving the member in an opposite direction from a neutral position.

9. In an automobile, the combination of speed changing gears, shifting devices for said gears, a movable member, mechanism to move said member to positions in opposite directions from a neutral position, a locking means for each of said devices to lock it to said member, a locking means for said member to lock it to said mechanism for moving the member in one direction from a neutral position, a locking means for said member to lock it to said mechanism for moving the member in an opposite direction from a neutral position, means to restore said member with the locked device to neutral position from any one of said moved positions, means to lock said restored device in neutral position, and means to lock the restored member in neutral position.

10. In an automobile, the combination of speed changing gears, shifting devices for said gears, a movable member, mechanism to move said member to positions in opposite directions from a neutral position, a locking means for each of said devices to lock it to said member, a locking means for said member to lock it to said mechanism for moving the member in one direction from a neutral position, a locking means for said member to lock it to said mechanism for moving the member in an opposite direction from a neutral position, means to restore said member with the locked device to neutral position from any one of said moved positions, and means to lock the restored member in neutral position.

11. In an automobile, the combination with a drive shaft, a clutch therefor, means to operate said clutch, and speed changing gears, of a movable member, mechanism to move said member to positions in opposite directions from a neutral position, means to lock any one of said gears to said member, means to lock said member to said mechanism, and means to operate said mechanism through the operation of said clutch operating means.

12. In an automobile, the combination with a drive shaft, a clutch therefor, means to operate said clutch, and speed changing gears, of a movable member, mechanism to move said member to positions in opposite directions from a neutral position, means to lock any one of said gears to said member, means to lock said member to said mechanism, and means to restore said member and locked gear to neutral position through the operation of said clutch operating means.

13. In an automobile, the combination with a drive shaft, a clutch therefor, means to operate said clutch, and speed changing gears, of a movable member, mechanism to move said member to positions in opposite directions from a neutral position, means to lock any one of said gears to said member, means to lock said member to said mechanism, means to operate said mechanism through the operation of said clutch operating means, and means to restore said member to neutral position through the operation of said clutch operating means.

14. In an automobile, the combination with a drive shaft, a clutch therefor, a pedal to operate said clutch, and speed changing gears, of a movable member, mechanism to move said member to positions in opposite directions from a neutral position, means to lock any one of said gears to said member, means to lock said member to said mechanism, and means to operate said mechanism through the operation of said pedal.

15. In an automobile, the combination of speed changing gears, shifting devices for said gears, a movable member, mechanism to move said member to positions in opposite directions from a neutral position, a locking means for each of said devices to lock it to said member independently of the others, a locking means for said member to lock it to said mechanism for moving the member in one direction from a neutral position, and an independently operable locking means for said member to lock it to said mechanism for moving the member in an opposite direction from a neutral position.

16. In an automobile, the combination of speed changing gears, shifting devices for said gears, a movable member, mechanism to move said member to positions in opposite directions from a neutral position, a locking means for each of said devices to lock it to said member independently of the others, a locking means for said member to lock it to said mechanism for moving the member in one direction from a neutral position, an independently operable locking means for said member to lock it to said mechanism for moving the member in an opposite direction from a neutral position, and means to restore said member to neutral position from any one of said moved positions.

17. In an automobile, the combination with a plurality of gears, of a movable member, mechanism to move said member to positions in opposite directions from a neutral position, a connecting means for each of said gears to connect it to said member independently of the others, and a connecting means for said member operable to connect it to said mechanism when the connecting means for the gear operates.

18. In an automobile, the combination of speed changing gears, a movable member, pivoted arms, means to actuate said arms, means to lock any one of said gears to said member, means to lock said member to one of said arms for moving the member in one direction from a neutral position, means to lock said member to the other of said arms for moving the member in an opposite direction from neutral position, and means to operate said arm-actuating means partially independently and partially together with said arms.

19. In an automobile, the combination of speed changing gears, a movable member, arms for moving said member, means to actuate said arms, a spring for actuating said arms, means to lock any one of said gears to said member, means to lock said member to one of said arms for moving the member in one direction from a neutral position, means to lock said member to the other of said arms for moving the member in an opposite direction from neutral position, means to operate said arm-actuating means to actuate said arms to move said movable member and compress said spring, and means to operate said arm-actuating means to release said arms and permit said spring to move said member.

20. In an automobile, the combination of speed changing gears, a movable member, mechanism to move said member to positions in opposite directions from a neutral position, a spring to operate said mechanism, means to lock any one of said gears to said member, means to lock said member to said mechanism, means to operate said mechanism to move said member and compress said spring, and means to operate said mechanism to release said member and permit said spring to move the member.

21. In an automobile, the combination of speed changing gears, a movable member, mechanism to move said member to positions in opposite directions from a neutral position, means for each of said gears to lock it to said member, means to lock said member to said mechanism, and a movable member to operate said locking means.

22. In an automobile, the combination of speed changing gears, shifting devices for said gears, a movable member, mechanism to move said member to positions in opposite directions from a neutral position, a locking means for each of said devices to lock it to said member, a locking means for said member to lock it to said mechanism for moving the member in one direction from a neutral position, a locking means for said member to lock it to said mechanism for moving the member in an opposite direction from a neutral position, and a movable member to operate said locking means.

23. In an automobile, the combination of speed changing gears, shifting devices for said gears, a movable member, mechanism to move said member to positions in opposite directions from a neutral position, a locking means for each of said devices to lock it to said member, locking means for said member to lock it to said mechanism, operating means for each of said locking means, and a movable member to actuate said operating means.

24. In an automobile, the combination of speed changing gears, shifting devices for said gears, a movable member, mechanism to move said member to positions in opposite directions from a neutral position, a locking means for each of said devices to lock it to said member, locking means for said member to lock it to said mechanism, a spring-operated actuator for each of said locking means, a member adapted to maintain said actuators in inoperative state, and means to move said latter member to set it to permit a pair of said actuators to operate their locking means for locking one of said devices to said former member and the former member to said mechanism.

25. In an automobile, the combination of speed changing gears, shifting devices for said gears, a movable member, mechanism to move said member to positions in opposite directions from a neutral position, a locking means for each of said devices to lock it to said member, locking means for said member to lock it to said mechanism, an actuator for each of said locking means, a movable member, and means to move said latter member to operate a plurality of said actuators to operate their locking means for locking one of said devices to said former member and the former member to said mechanism.

26. In an automobile, the combination of speed changing gears, shifting devices for said gears, a movable member, mechanism to move said member to positions in opposite directions from a neutral position, a locking means for each of said devices to lock it to said member, locking means for said member to lock it to said mechanism, means for each gear to connect it to said member, a yieldable actuator for each of said locking means, a movable member adapted to maintain said actuators in inoperative state, and means to move said latter member and set it to operate a plurality of said actuators to operate their locking means for locking one of said devices to said former member and the former member to said mechanism.

27. In an automobile, the combination of speed changing gears, a movable member, mechanism for moving said member, means to lock any one of said gears to said member, and means to lock said member to said mechanism.

28. In an automobile, the combination with a plurality of gears, of a movable member, mechanism for moving said member, independently operable locks for each of said gears to lock it to said member, and an independently operated locking means for said member to lock it to said mechanism.

29. The combination with speed changing gears, of a movable member, locks for locking said gears to said member, a pair of arms adapted to swing in opposite directions with respect to said movable member and means for locking said member to either arm at will.

30. In an automobile, the combination with a plurality of gears, of a movable member, mechanism adapted to move said member in either direction, locks for connecting said member to said mechanism according to the direction of movement desired, independently operable locks for connecting the gears respectively to said movable member and a shiftable bar or rod adapted to control the action of said locks to connect in its several positions one of said gears, independently of the others, to said movable member and at the same time connect said movable member to said mechanism.

Signed at the city of New York, in the county of New York, and State of New York, this 4th day of August A. D. 1916.

MERION J. HUGGINS.
WILLIAM C. DRESSLER.

Witnesses:
CHARLES LA RUE,
B. ROMAN.